(No Model.)

B. J. HEALY.
TWO WHEELED VEHICLE.

No. 364,714. Patented June 14, 1887.

Witnesses.
John C. Perkins
J. L. West

Inventor.
Byron J. Healy
By Lucius C. West
atty.

UNITED STATES PATENT OFFICE.

BYRON J. HEALY, OF KALAMAZOO, MICHIGAN, ASSIGNOR TO JOHN GALLIGAN AND FRANK N. HORN, BOTH OF SAME PLACE.

TWO-WHEELED VEHICLE.

SPECIFICATION forming part of Letters Patent No. 364,714, dated June 14, 1887.

Application filed April 29, 1887. Serial No. 236,577. (No model.)

*To all whom it may concern:*

Be it known that I, BYRON J. HEALY, a citizen of the United States, residing at Kalamazoo, county of Kalamazoo, State of Michigan, have invented a new and useful Two-Wheeled Vehicle, of which the following is a specification.

This invention relates to that well-known class of two-wheeled vehicles the body or seat-bars of which are fulcrumed at the forward end and are supported by springs from the axle; and it has for its object a peculiar formation of the supporting-springs and a novel association of them with the body and axle, as below described and claimed.

Figure 1:
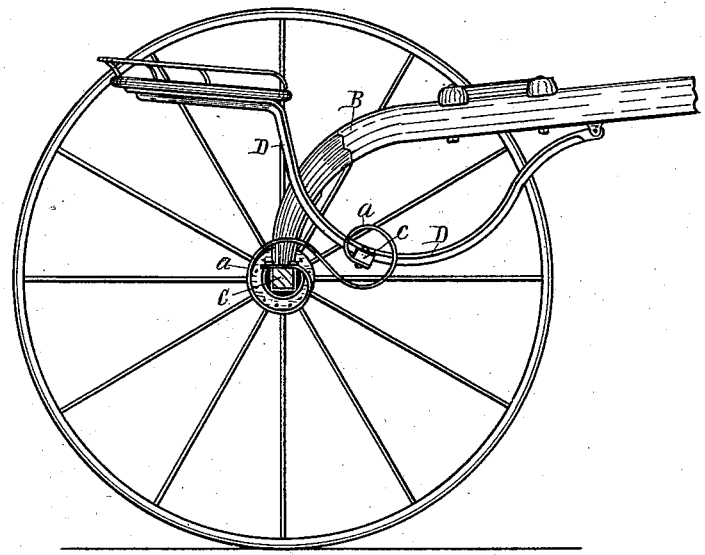
Figure 2:
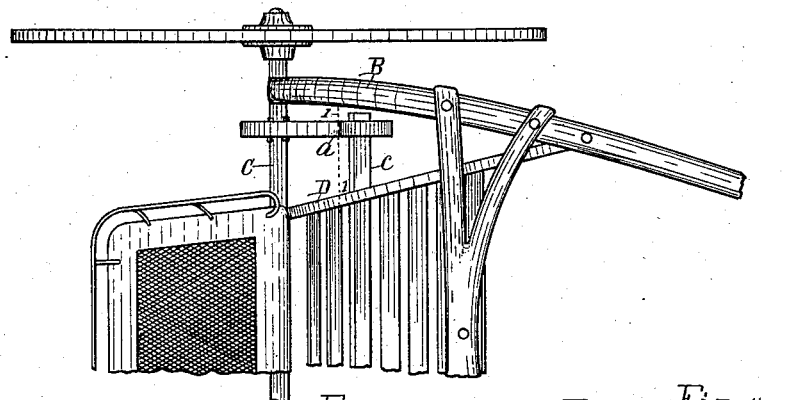
Figure 4:
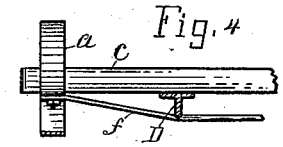
Figure 3:
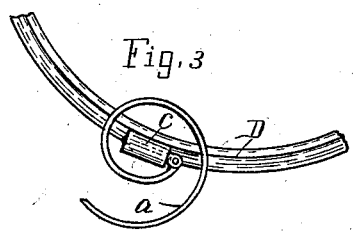

In the drawings forming a part of this specification, Figure 1 is a side elevation, with one wheel removed and the rear part of one thill broken; Fig. 2, a plan of about one-half of the vehicle; Fig. 3, enlarged lettered details from Fig. 1, showing a change; and Fig. 4 is a rear view of lettered details, with parts in section on dotted line 1 1 in Fig. 2.

Referring to the lettered parts of the drawings, B are the thills; D, the seat-bars of the body, fulcrumed at the forward end, and C the axle, all substantially as heretofore disclosed.

The spring $a$ is composed of a single piece of spring metal in the form of two connected coils inverted in their relative position to each other, each coil being substantially alike in shape and size. The inner end of the rear coil is attached to the axle so that the coil surrounds the axle, and the inner end of the forward coil, in Fig. 1, is rigidly attached to the end of a bar, $c$, extending laterally from the body of the vehicle. This bar $c$ is at an oblique angle to a horizontal plane, and by that means exerts a coiling-leverage on this end of the spring when the body swings down, bringing the bar $c$ to a horizontal plane; also, when the body is borne farther down by a heavier person, or by two persons in a double-sized seat, the action is to pull forward on the spring $a$, as well as to close the coil, and the spring is thus greatly stiffened for bearing the heavier weight.

The relation of the body and spring is such, in connection with the points of attachment shown and the fulcrum of the body, that the vertical swing of the body exerts a like action on each coil of the spring. So far as this laterally-extended bar $c$ is concerned, it is not new with me as a spring-support or point of attaching a spring which supports the body from the axle, and, if preferred, the end of the spring may be attached to the seat-bar or foot-slat of the body. Of course it will be understood that both sides of the vehicle are like the side here shown.

In Fig. 3 I have shown the forward end of the spring $a$ hinged or jointedly attached to its support $c$. This plan may be adopted when desiring to construct a vehicle for two persons or a very heavy person and yet have it suitable for one person. The body and spring in this instance have a freer action under the weight of a single person than in Fig. 1, and if two persons are in the seat the bar $c$, in assuming a horizontal plane, contacts with the spring at the back side of the bar, and in this condition the spring action is the same as if the end were rigidly attached, as in Fig. 1. In Fig. 4 the bar $c$ is on top of the T-bar D, and takes the place of one of the foot-slats. $f$ is a truss attached at each end to the ends of the bar $c$, and contacts the lower edge of the single flange of the T-bar. This strengthens the bar $c$, and hence it may be lighter material. I prefer this construction to that in Figs. 1 and 2.

I form a little niche in the under edge of the T-bar, for the truss $f$ to fit into and obviate lateral displacement thereby.

Having thus described my invention, what I claim is—

The combination of the body, fulcrumed at the forward end, and the axle, with the spring, consisting of two connected coils made from a single strip of metal, said coils being inverted in their relative position to each other, the inner end of the rear coil being rigidly attached to the axle, and the inner end of the forward coil being attached to the body in the relation shown, substantially as set forth.

In testimony of the foregoing I have hereunto subscribed my name in presence of two witnesses.

BYRON J. HEALY.

Witnesses:
GEO. O. B. HALL,
SAMUEL FOLZ.